(12) United States Patent
Short et al.

(10) Patent No.: US 6,953,278 B2
(45) Date of Patent: Oct. 11, 2005

(54) MIXING MACHINE WITH ACCESSIBLE INTERNAL CONTROL UNIT

(75) Inventors: Ellis Gale Short, Sydney, OH (US); Brian E. Bader, Springfield, OH (US); Joseph C. Huang, Dayton, OH (US); James K. Miller, Casstown, OH (US)

(73) Assignee: Premark FEG L.L.C., Wilmington, DE (US)

( * ) Notice: Subject to any disclaimer, the term of this patent is extended or adjusted under 35 U.S.C. 154(b) by 144 days.

(21) Appl. No.: 10/328,536

(22) Filed: Dec. 23, 2002

(65) Prior Publication Data

US 2004/0120213 A1 Jun. 24, 2004

(51) Int. Cl.[7] .............................................. A47J 43/044
(52) U.S. Cl. ..................................... 366/206; 366/601
(58) Field of Search ................................ 366/197, 206, 366/343, 344, 601

(56) References Cited

U.S. PATENT DOCUMENTS

| | | | | |
|---|---|---|---|---|
| 2,789,798 A | * | 4/1957 | Brace .......................... | 366/199 |
| 3,224,743 A | * | 12/1965 | Freedman et al. .......... | 366/200 |
| 3,934,758 A | * | 1/1976 | Kipp .......................... | 222/108 |
| 4,325,643 A | * | 4/1982 | Scott et al. ................. | 366/200 |
| 4,697,929 A | | 10/1987 | Muller | |
| 4,819,460 A | | 4/1989 | Obradovic | |
| 4,822,172 A | * | 4/1989 | Stottmann ................... | 366/142 |
| 5,000,578 A | | 3/1991 | Artin et al. | |
| 5,040,899 A | * | 8/1991 | Koskinen .................... | 366/281 |
| 5,306,083 A | | 4/1994 | Caldwell et al. | |
| 5,348,393 A | | 9/1994 | Pappas, Jr. | |
| 5,472,276 A | | 12/1995 | Ratermann et al. | |
| 5,653,535 A | | 8/1997 | Xie et al. | |
| 5,690,427 A | | 11/1997 | Jennings | |
| 5,736,828 A | | 4/1998 | Turner et al. | |
| 5,844,343 A | | 12/1998 | Horst | |
| 5,872,435 A | | 2/1999 | Bolte et al. | |
| 5,906,432 A | | 5/1999 | Wade et al. | |
| 5,934,802 A | | 8/1999 | Xie | |
| 5,957,021 A | | 9/1999 | Meredith et al. | |
| 6,066,074 A | | 5/2000 | Marcinkiewicz | |
| 6,612,732 B2 | * | 9/2003 | Blakeman et al. .......... | 366/209 |
| 2002/0093877 A1 | | 7/2002 | Brunswick et al. | |
| 2002/0186615 A1 | * | 12/2002 | Wilson ....................... | 366/199 |

* cited by examiner

Primary Examiner—David Sorkin
(74) Attorney, Agent, or Firm—Thompson Hine LLP

(57) ABSTRACT

A mixing machine includes portions of a control system formed as a unit that is mounted within the machine for movement between an operating position internal of the machine and a service position in which at least part of the unit extends through an opening in the machine for access thereto.

28 Claims, 8 Drawing Sheets

MIXING MACHINE WITH ACCESSIBLE INTERNAL CONTROL UNIT

TECHNICAL FIELD

The present application relates generally to mixing machines utilized for mixing food products such as dough, and more particularly to a mixing machine having an internal control unit that moves to an easily accessible service position.

BACKGROUND

As mixing machines become more and more technologically advanced, the control systems used in such machines become more advanced as well. Facilitating access to such control systems is an important part of providing a customer friendly, commercially successful product.

Accordingly, it would be advantageous to provide a mixing machine with a mounting system for a control unit that facilitates service access to the control unit.

SUMMARY

In one aspect, a mixing machine includes a rotatable output member for receiving a mixer tool and a body portion including an opening along a portion thereof. A drive assembly includes a drive motor operatively connected to effect rotation of the rotatable output member and a control system controls operation of the drive motor. A user interface provides input to the control system. Portions of the control system, including a motor drive heat sink, are formed as a unit that is mounted for movement between an operating position within the mixer body and a service position in which at least part of the unit extends outward from the opening to provide access to the portions of the control system forming the unit.

In another aspect, a mixing machine includes a rotatable output member for receiving a mixer tool and a body portion including an opening along a portion thereof. A drive assembly includes a drive motor operatively connected to effect rotation of the rotatable output member and a control system controls operation of the drive motor. Portions of the control system are formed as a unit, the unit mounted for movement between an operating position within the mixer body and a service position in which at least part of the unit extends outward from the opening to provide access to the portions of the control system forming the unit. When the unit is in the operating position multiple wires connect the portions of the control system to other parts of the mixer. When in the service position the unit is supported in place even when the multiple wires are not connected between the portions of the control system and the other parts of the mixer.

In a further aspect, a mixing machine includes a base and a column extending upward from the base, the column including an opening along one side thereof. A head extends outward from the column over a bowl receiving area, the head including a downwardly extending rotatable output member for receiving a mixer tool. A drive assembly includes a drive motor operatively connected to effect rotation of the rotatable output member and a control system controls operation of the drive motor. A mount panel includes at least part of the control system mounted thereon, the mount panel movable between an operating position within the column and a service position in which at least a portion of the mount panel extends outward from the opening to provide access to the part of the control system on the mount panel.

In another aspect, a method of manufacturing a mixing machine involves the steps of: providing a motor internal of the mixer to effect rotation of an output member adapted to receive a mixer tool, the motor including multiple wiring connectors; providing a user interface on an external portion of the mixer, the user interface including multiple wiring connectors; providing an opening in a body of the mixer; constructing a motor control unit including a motor drive and a number of wiring connectors; inserting the motor control unit through the opening so as to be located internally of the mixer; interconnecting the motor wiring connectors with corresponding connectors on the motor control unit; interconnecting the user interface wiring connectors to corresponding connectors on the motor control unit; and securing the motor control unit to an internal portion of the mixer.

DETAILED DESCRIPTION

Figure 1:
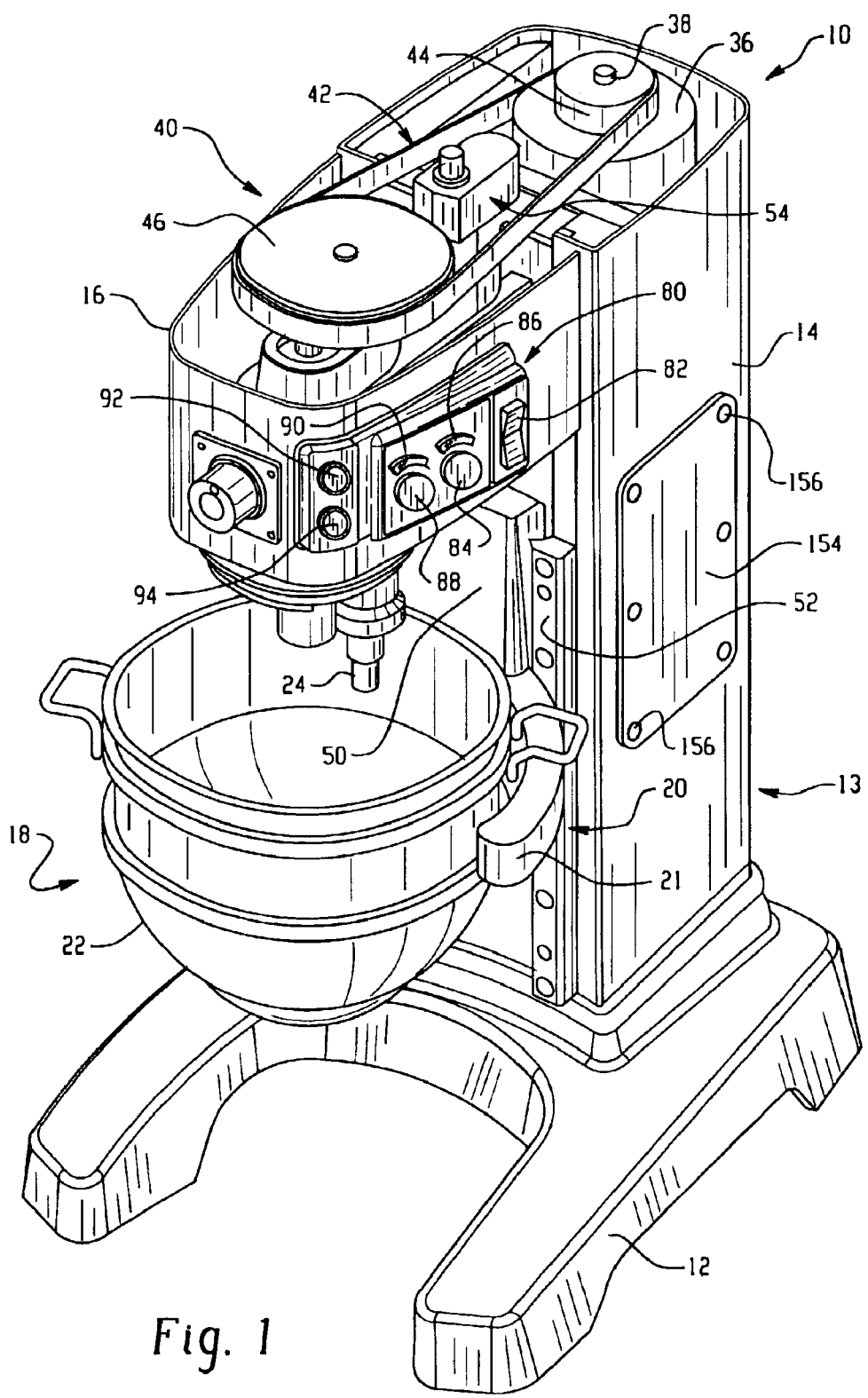
FIG. 1 is a perspective view of a mixing machine with the top cover removed.
Figure 2:
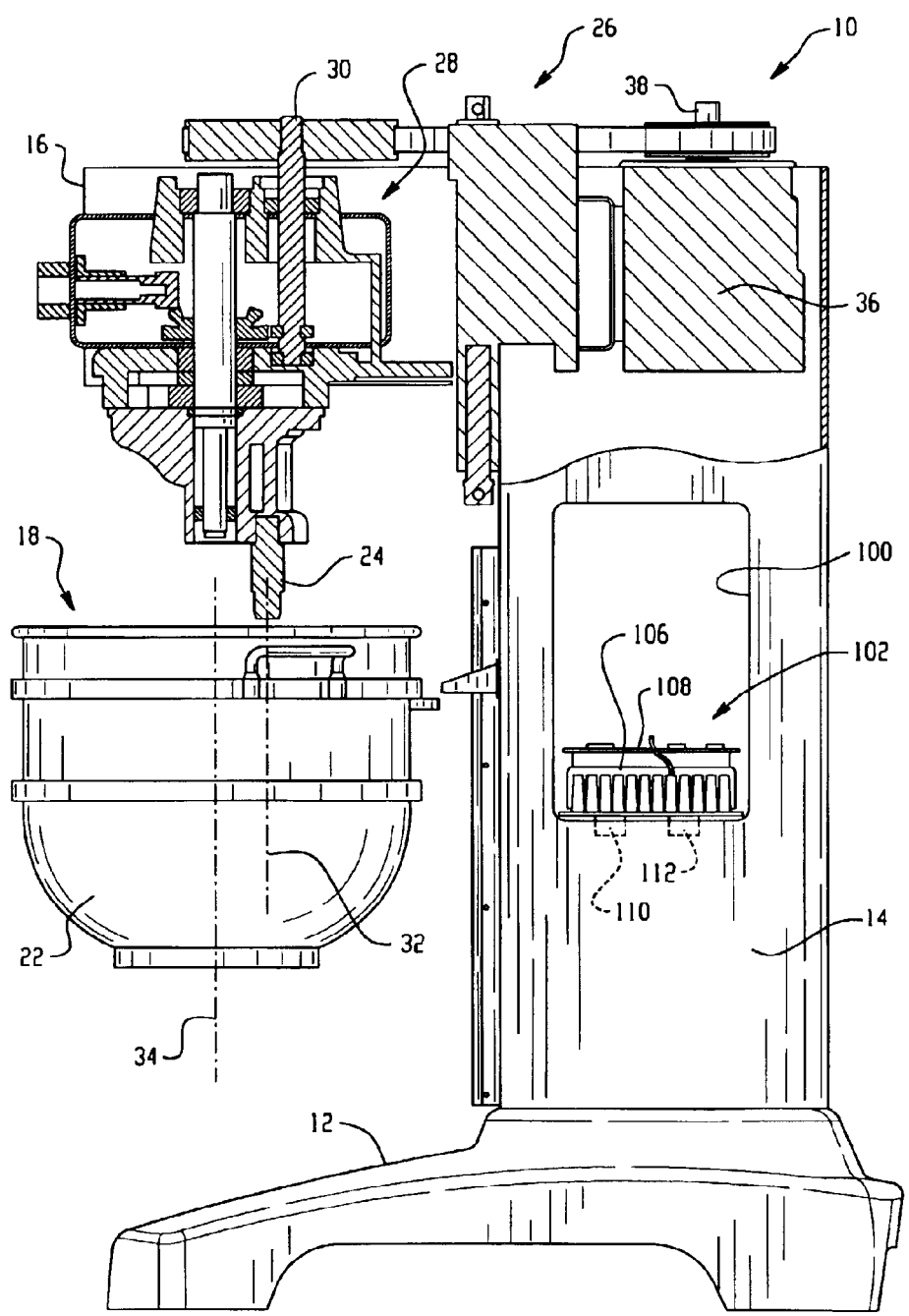
FIG. 2 is a side elevation of the mixing machine of FIG. 1 in partial cross-section.
Figure 3:
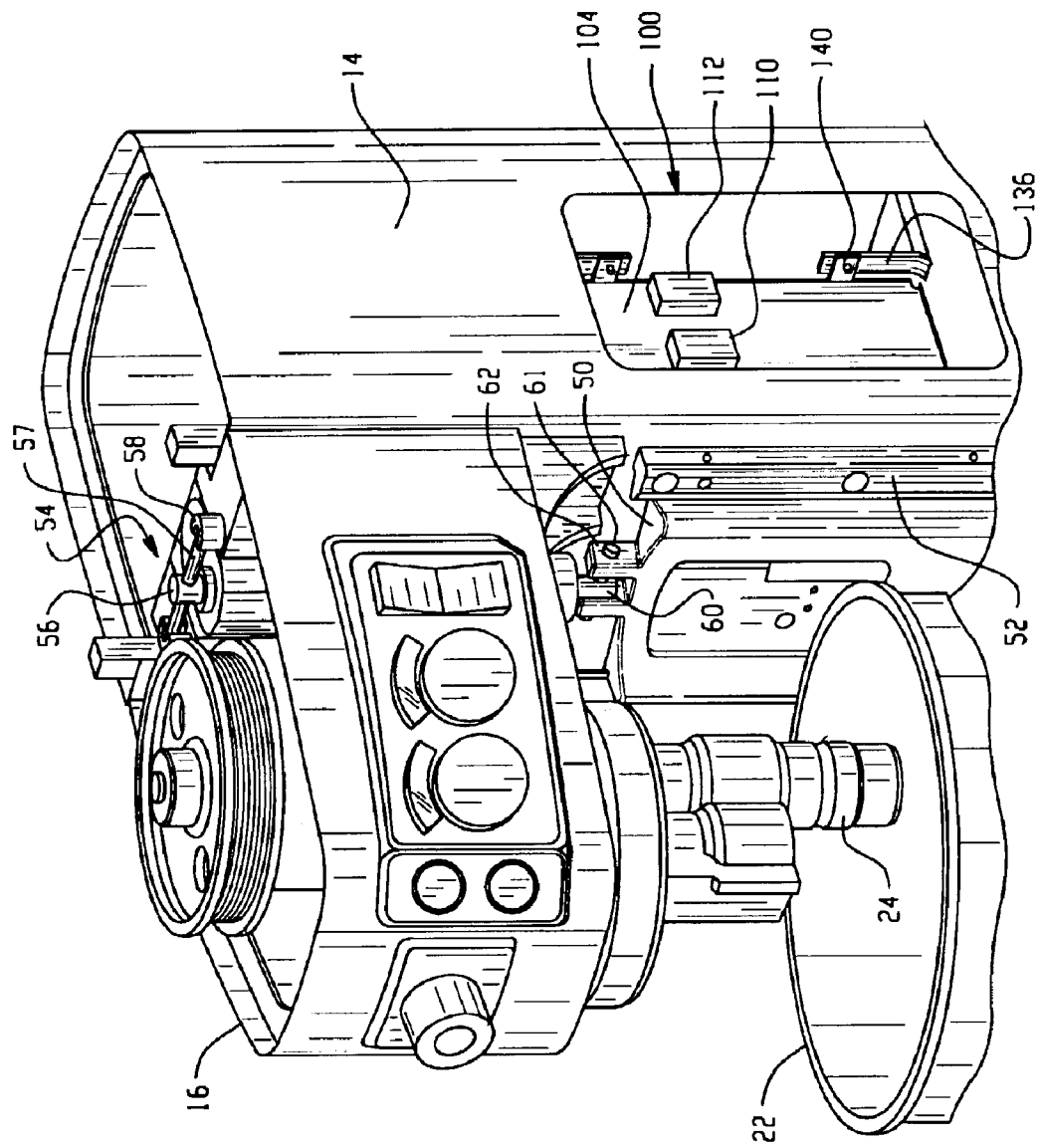
FIG. 3 is a perspective view of an upper portion of the mixing machine of FIG. 1.

Referring to FIGS. 1–3, a mixing machine 10 is shown and includes a base 12, a mixer body 13 including a column 14 extending upward from the base 10, and a head 16 extending outward from the column 14 and over a bowl receiving location 18. The bowl receiving location 18 may be defined by a bowl receiving portion 20 of the mixer body 13, where the bowl receiving portion 20 has spaced apart curved arms 21 defining a curved shape to match the bowl 22. The head includes a downwardly extending rotatable output member 24 that can receive a mixer tool such as dough hook, whisk or other tool. The head 16 and upper portion of the column 14 typically include a detachable cover (not shown) for enclosing the components.

The mixing machine includes a drive assembly 26 for effecting rotation of the rotatable output member 24. In the illustrated machine the drive assembly is formed in part by a gear system 28 within the head 16 and having an upwardly extending input drive shaft 30. In the case of a planetary mixer, the gear system 28 may take the form of a planetary gear system, in which case the rotatable output member 24 rotates about its own axis 32, with the axis 32 orbiting around a central bowl axis 34. Also forming part of the drive assembly is a drive motor 36 that is mounted and located in line with the column 14 and includes an upwardly extending output shaft 38. A drive linkage 40 connects the motor output shaft 38 to the gear system input shaft 30 and may be formed by the illustrated belt 42 and pulleys 44 and 46. Alternative drive linkages could take the form of chain and sprocket combinations, additional gearing and/or bar-type linkages. The illustrated drive linkage 40 is a fixed linkage, meaning that the drive ratio between the motor output shaft 38 and the gear system input shaft 30 does not change.

The bowl receiving portion 20 may be mounted for movement between a raised position toward the head 16 and a lowered position away from the head 16, the raised position being used during mixing operations and the lowered position being used for bowl installation and removal as well as for installation and removal of mixing tools on the rotatable output member 24. In this regard, the curved arms 21 of the bowl receiving portion 20 connect with a central support 50 and the support 50 rides upward and downward on a pair of spaced apart guide rails 52 on the front side of the column 14. A power lift mechanism 54, such as a linear actuator, may be provided for effecting upward and downward movement of the bowl receiving portion 20. In one embodiment, a suitable linear actuator is the Warner Electric DC24-10A5 series DC motor 8" stroke length gear train and ACME screw actuator. A top portion 56 of the linear actuator may be secured to mounts 58 unitary with an internal casting of the head, and a lower moving arm or rod portion 60 may be connected to mounts 62 on the support 50 as shown in FIG. 3. In both places a corresponding pin 57 or 61 extending respectively through top portion 56 and moving rod portion 60 can be used for connection to the respective mounts 58 and 62. The moving arm or rod portion 60 extends from a housing portion 63.

In one embodiment a switched reluctance motor is provided as the drive motor 36. A switched reluctance motor is desirable because it can provide high torque at low operating speeds, such as those often used in mixing applications for planetary mixers. In another embodiment, an AC induction motor might be used.

Figure 4:
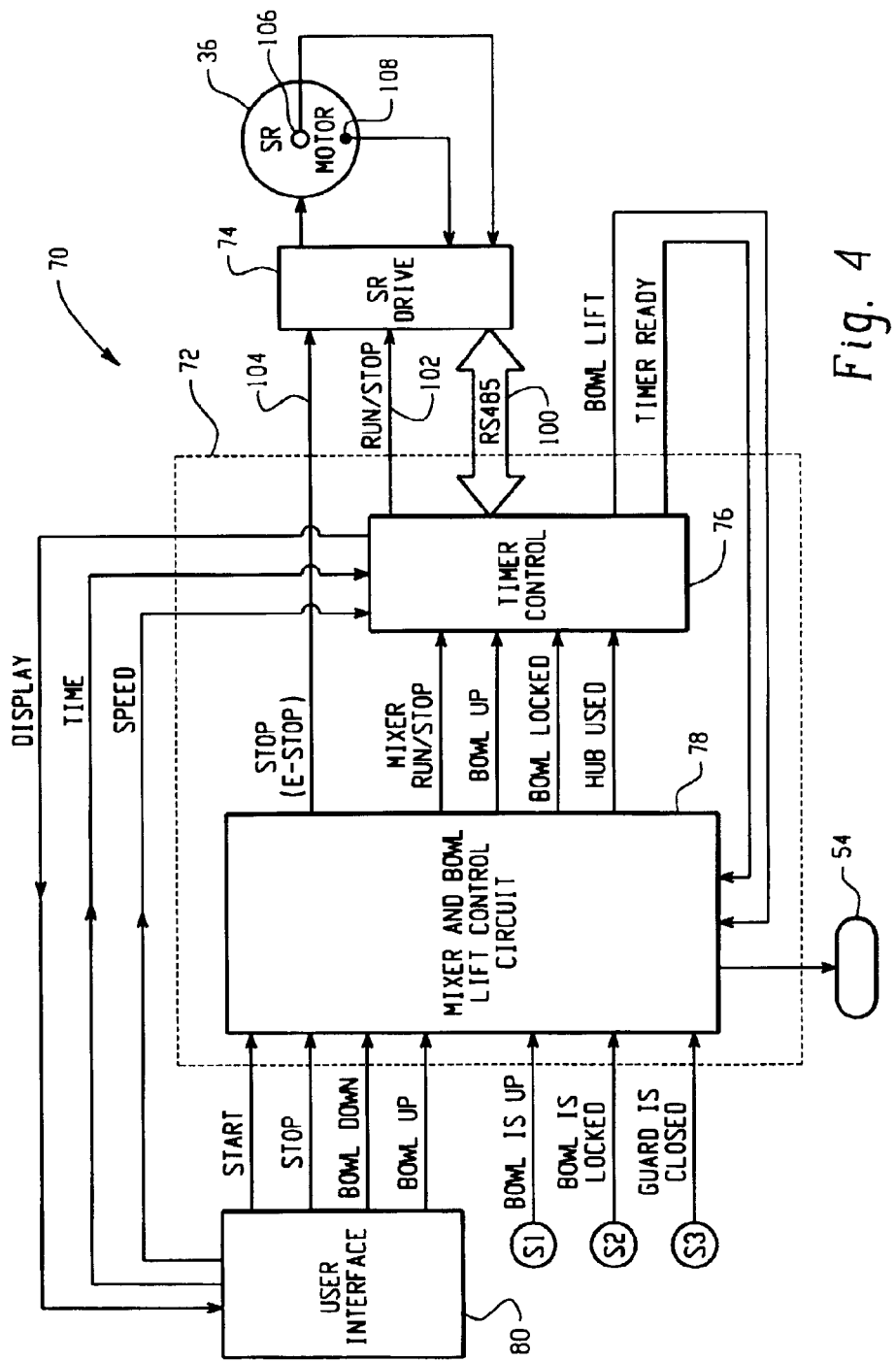
FIG. 4 is a control system schematic for the mixing machine of FIG. 1.

Referring to FIG. 4, an exemplary control arrangement for a switched reluctance motor embodiment is shown and includes a control system 70 formed by a control unit 72 and a switched reluctance ("SR") drive 74. The control unit 72 includes a processor or microcontroller based timer control unit 76 and an analog control circuit 78. A user interface 80 enables a user to input desired operations to the control unit 72, and a plurality of sensors S1, S2, and S3 are also connected with the control unit 72 and indicate the status of various parts of the mixer as will be described in more detail below. In an embodiment using an AC induction motor, a variable frequency AC drive could be used in place of the SR drive 74.

Referring again to FIG. 1, an exemplary user interface 80 is located on the head 16 and includes a plurality of input mechanisms including a bowl up/down switch 82 for activating the power bowl lift mechanism 54, a time input mechanism 84 and associated LED display 86 for inputting a desired mix time, a speed input mechanism 88 and associated LED display 90 for inputting a desired mix speed, a mix start button 92 and a mix stop button 94.

As seen in FIGS. 2, 3, 5, 6, and 7, a side of the column 14 includes an opening 100 therethrough. Portions of the control system 70 can be formed as a unit 102 that is insertable in the opening, and is mounted for movement between an operating position (e.g., FIG. 3) within the column and a service position (e.g., FIG. 2 and FIG. 7) in which at least part of the unit 102 extends outward from the opening 100 to provide access to the portions of the control system forming the unit 102. In one embodiment, it is contemplated that the unit 102 includes the SR drive 74 and much of the analog control circuit 78, with the timer control unit 76 formed as a separate board located within the head 16 at the interior side of the user interface 80. The opening 100 could be formed on any one of the front side, rear side or either lateral side of the column 14.

Figure 5:
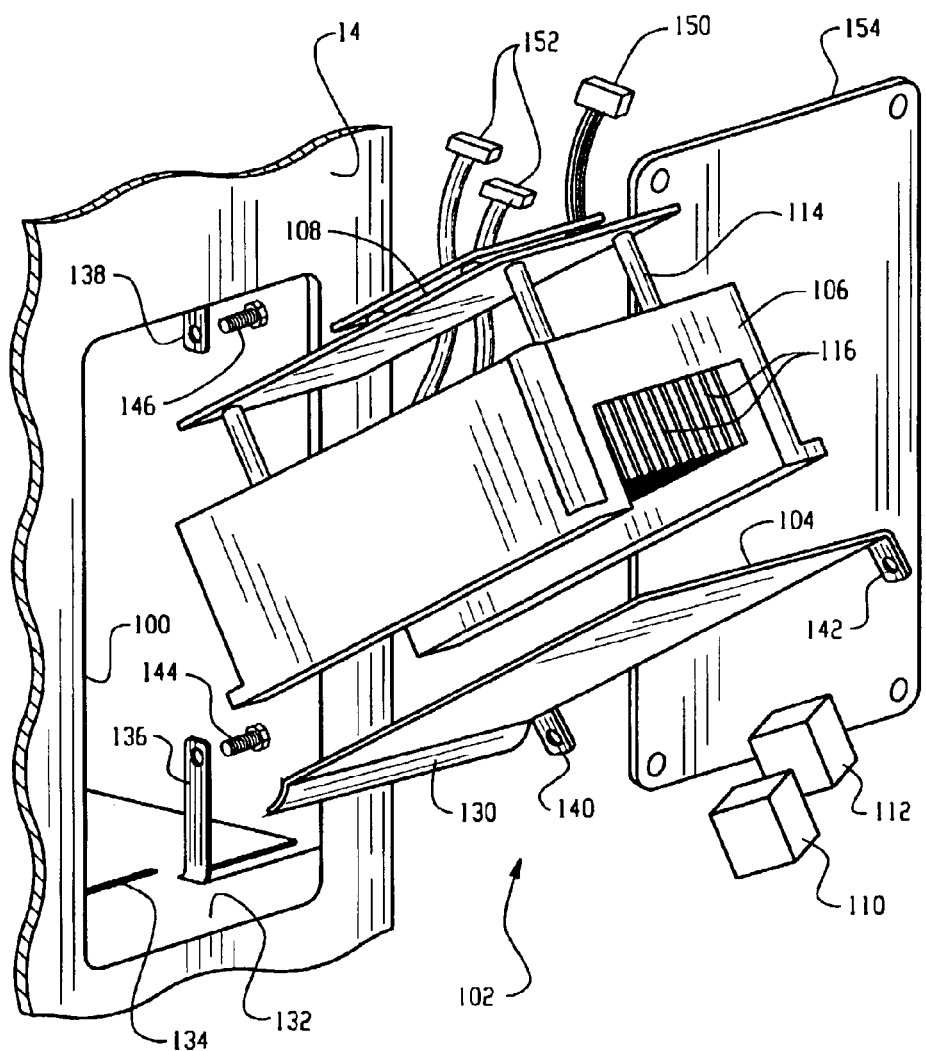
FIG. 5 is a side view of the mixing machine showing an exploded view of a control unit.
Figure 6:
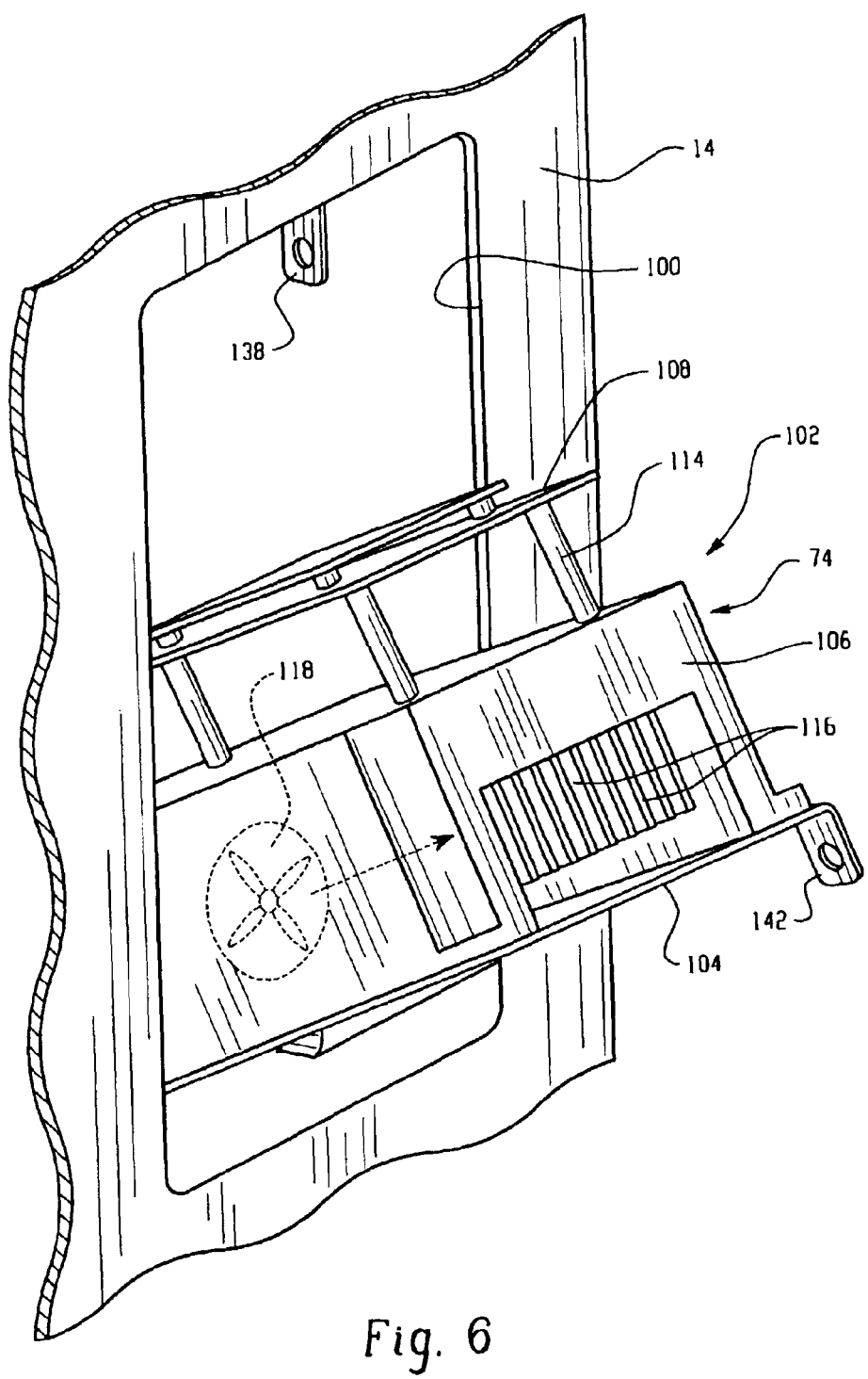
FIG. 6 is a side view showing the assembled unit partially inserted within an opening of the mixing machine.
Figure 7:
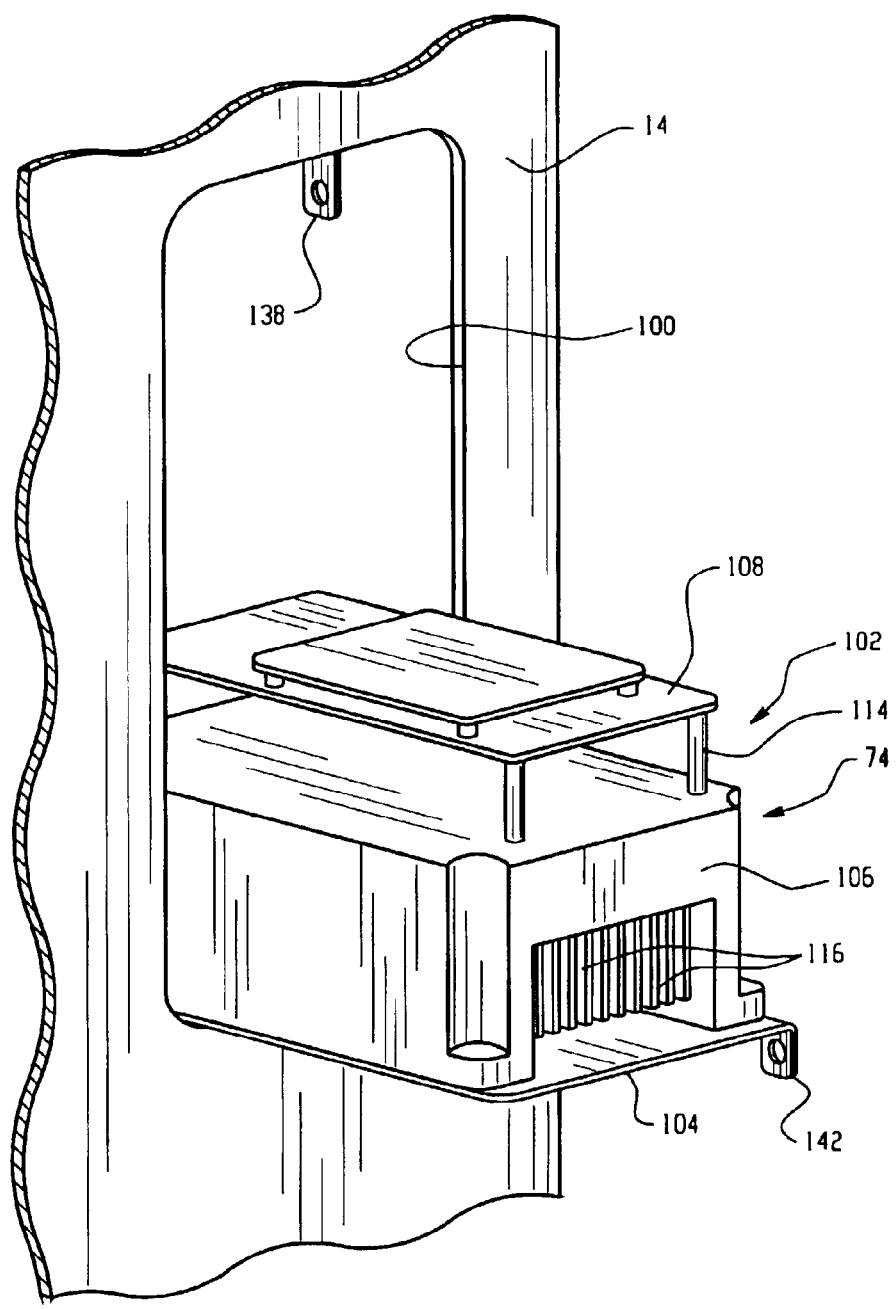
FIG. 7 is a side view showing the unit in a service position.

The partially exploded view of FIG. 5 shows a mount panel 104 to which the SR drive 74 with associated heat sink 106, which may be aluminum cast, and control board 108 are attached, along with a transformer 110 and contactor 112 (both shown as blocks for simplicity). The mount panel 104 may be a stainless steel plate, but could also be formed of some other material. The heat sink 106 is mounted directly to a top side of the mount panel 104 using appropriate fasteners and the control board 108 is mounted in a spaced apart relationship from the heat sink 106 via mount posts 114. The transformer 110 and contactor 112 may be connected to the underside of the mount panel 104 using suitable fasteners as well. A fuse holder and other applicable components may also be mounted on the underside of mount panel 104.

Figure 8:
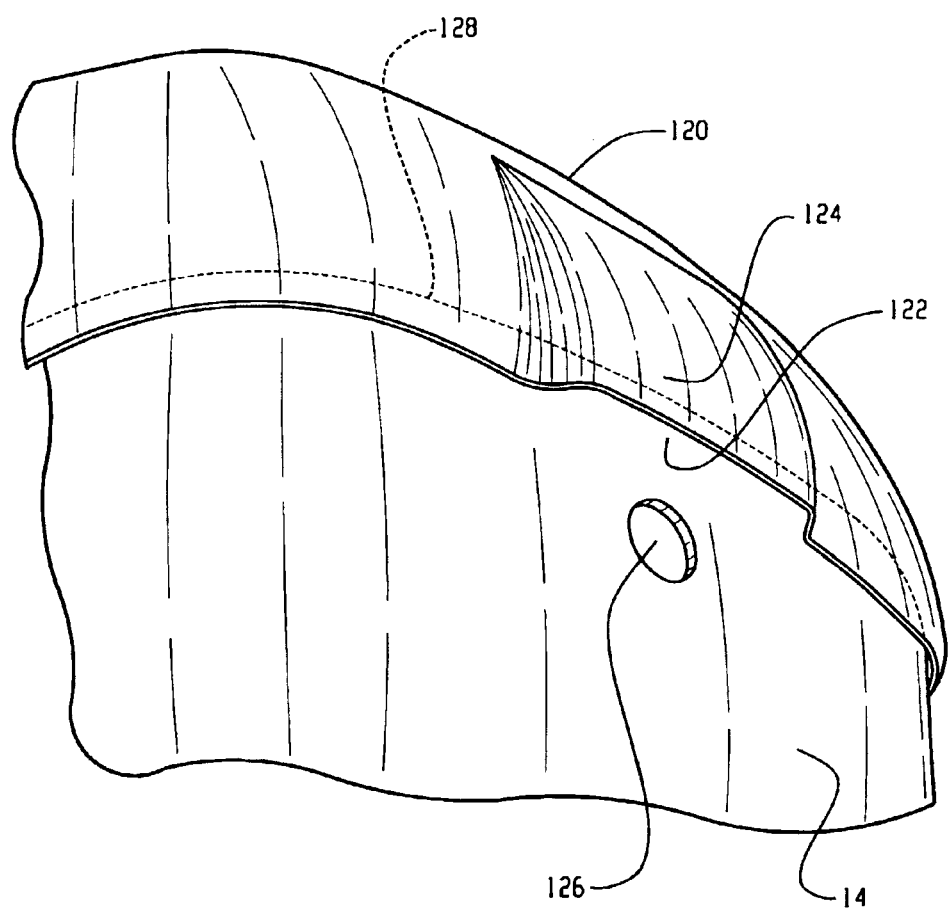
FIG. 8 is a rear view of a top portion of the mixing machine including the top cover.

The heat sink 106 includes a plurality of fins 116 and a fan 118 (shown in dashed lines) positioned to blow air along the fins 116 for cooling. In the illustrated embodiment, the mount panel 104, fins 116, and control board 108 are all arranged substantially vertical when the unit 102 is in the upright operating position of FIG. 3. The fan 118 blows air upward along the fins 116 when the unit 102 is in this operating position. The drive motor 36 may also include an integrated fan blowing air upward over the notor windings. An upper portion of the column may include an opening for ventilation purposes. In one embodiment, shown in FIG. 8 where a rear side of the upper portion of the column 14 is shown with top cover 120, a ventilation opening 122 is formed by a protruding channel 124 formed in the top cover 120 to be spaced away from the outer shell or skin of the column 14. A power cord opening 126 is also shown. The top 128 of the column 14 is shown in dashed line.

In the illustrated embodiment the unit 102 is configured for pivotal movement between the operating position and the service position. In particular, the mount panel 104 includes an offset bend 130 at one end thereof. Within the column 14 a fixed lateral support panel 132 is provided and includes a slot 134 formed therein. The slot 134 receives the offset bend portion 130 of the mount panel 104 allowing the mount panel 104 to be pivoted or rotated between the upright operating position and the lateral service position. The offset bend 130 limits downward movement of the mount panel 104 within the slot 134, but allows the mount panel 104 to be easily removed from the slot 134 if desired. The lateral support panel 132 may be mounted to a plurality of upright supports within the column 14. Brackets 136 and 138 are provided within the column and corresponding flanges 140 and 142 are provided on the unit 102 such that when the unit 102 is in the operating position flange 140 aligns with bracket 136 and flange 142 aligns with bracket 138. The lower bracket 136 may be formed as a unitary upright bent portion of the lateral support panel 132, the upper bracket 138 may be formed unitary with an upper panel (not shown) and the flanges 140 and 142 may each be formed as unitary bent portions of the mount panel 104. The respective flanges and brackets can be formed with openings that align to permit fasteners 144 and 146 to be passed therethrough in order to secure the unit 102 in the operating position. Bolt and nut combinations could be used as fasteners, but other types of fasteners could also be used. When the fasteners 144 and 146 are released (e.g., removed), the unit 102 can be rotated downward into the service position.

When in the service position the underside of the mount panel may rest on lower edge 148 of the opening 100, with the offset bend 130 remaining in the slot 134 to prevent the unit 102 from falling out of the opening 100. Additionally, the transformer 110 and the contactor 112 are mounted far enough out on the underside of the mount panel 104 so as to be clear of the opening 102 and positioned on the outside of the column 14.

The various portions of the control system 70 integrated into unit 102 require electrical and electronic attachment to other parts of the mixing device. In particular, where the SR drive 74 and analog control circuit 78 are integrated with the unit 102, the timer control unit 76 will require connection with both. Similarly, the drive motor 36 will require electrical connection with the SR drive 74. The transformer 110 will require connection with the incoming power. For this purpose, the SR drive 74, transformer 110 and contactor 112 include a plurality of wiring connectors for making both electronic and electrical connections. For example, the control board 108 may include a communication cable and connector 150 for connection with a similar cable and connector (not shown) extending from the timer control unit 76, and cables and connectors 152 may be provided for connection with the drive motor 36. The transformer 110 and contactor 112 may have similar cables and connectors, or may simply include terminals to which connectors from other parts of the mixer are connected.

The unit 102 may be formed during manufacture, prior to installation in the column 14. The unit 102 is then inserted through the opening 100 so as to be located internally of the mixer column 14. During this step the unit 102 may be moved in laterally and then pivoted slightly upward to position in the offset bend 130 of the mount panel 104 into the slot 134. The unit can then be pivoted back down to its service position to facilitate interconnecting the motor wiring connectors with corresponding connectors 152 on the unit 102 and interconnecting the user interface wiring connectors (e.g., connectors from the timer control unit 76 and connectors from the time input mechanism 84 and speed input mechanism 86) to corresponding connectors 150 on the unit. The unit 102 can then be pivoted upward to its operating position and secured to the brackets 136 and 138. A cover 154 is thereafter placed over the opening 100 and connected by a plurality of fasteners 156. A gasket (not shown) may be provided between the cover 154 and the side of the column 14.

It is to be clearly understood that the above description is intended by way of illustration and example only and is not intended to be taken by way of limitation. Other changes and modifications could be made, including both narrowing and broadening variations and modifications of the appended claims. For example, while a unit that pivots between the operating position and the service position has been primarily described herein, it is contemplated that a unit that slides between the operating position and service position could be provided, such as a drawer contained unit sliding in and out of the opening in the column, in which case part of the drawer could be considered the mount panel.

What is claimed is:

1. A mixing machine, comprising:
    a rotatable output member for receiving a mixer tool;
    a mixer body including an opening along a portion thereof;
    a drive assembly including a drive motor operatively connected to effect rotation of the rotatable output member;
    a control system for controlling operation of the drive motor;
    a user interface providing input to the control system; and
    wherein portions of the control system, including a motor drive heat sink, are mounted to the mixer body as a unit configured for movement relative to the mixer body between an operating position within the mixer body and a service position in which the unit remains mounted to the mixer body and at least part of the unit extends outward from the opening to provide access to the portions of the control system forming the unit.

2. The mixing machine of claim 1 wherein the unit includes a plurality of wiring connectors for connecting the portions of the control system with corresponding connectors in the mixer body, when the plurality of wiring connectors are disconnected from the corresponding connectors the unit is removable through the opening.

3. The mixing machine of claim 1 wherein a part of the unit is configured to close the opening when the unit is in the operating position.

4. The mixing machine of claim 1 wherein motor drive heat sink has a plurality of fins arranged substantially vertically when the unit is in the operating position, and a fan for blowing air along the fins.

5. The mixing machine of claim 4, further comprising:
    a top cover positioned on a mixer head portion of the mixer body, the top cover including a protruding channel along a back portion thereof, a ventilation opening formed in part by the protruding channel.

6. The mixing machine of claim 1 wherein the unit is formed on a mount panel that is pivotally mounted in the mixer body.

7. A mixing machine, comprising:
    a rotatable output member for receiving a mixer tool;
    a mixer body including an opening along a portion thereof;
    a drive assembly including a drive motor operatively connected to effect rotation of the rotatable output member;
    a control system for controlling operation of the drive motor;
    wherein portions of the control system are mounted to the mixer body as a unit configured for movement relative to the mixer body between an operating position within the mixer body and a service position in which the unit remains mounted to the mixer body and at least part of the unit extends outward from the opening to provide access to the portions of the control system forming the unit;
    when in the operating position multiple wires connect the portions of the control system to other parts of the mixing machine;
    when in the service position the unit is supported in place even when the multiple wires are not connected between the portions of the control system and the other parts of mixing machine.

8. The mixing machine of claim 7 wherein the unit is pivotally mounted to the mixing machine.

9. The mixing machine of claim 8, further comprising:
    a mount slot located within the mixer body;
    the unit including a portion positioned within the slot to permit both pivotal and upward movement of the unit.

10. The mixing machine of claim 8 wherein a portion of the unit closes the opening when the unit is in the operating position.

11. The mixing machine of claim 7 wherein the unit is mounted for sliding movement relative to the mixing machine.

12. The mixing machine of claim 7 wherein the unit includes a plurality of wiring connectors for connecting with corresponding connectors in the mixer body, when the plurality of wiring connectors are disconnected from the corresponding connectors the unit is removable through the opening.

13. A mixing machine, comprising:

a base;

a column extending upward from the base, the column including an opening along one side thereof;

a head extending outward from the column over a bowl receiving area, the head including a downwardly extending rotatable output member for receiving a mixer tool;

a drive assembly including a drive motor operatively connected to effect rotation of the rotatable output member;

a control system for controlling operation of the drive motor;

a mount panel including at least part of the control system mounted thereon, the mount panel movable between an operating position within the column and a service position in which at least a portion of the mount panel extends outward from the opening to provide access to the part of the control system on the mount panel.

14. The mixing machine of claim 13 wherein the mount panel extends generally upward when in the operating position and is rotated outwardly when in the service position.

15. The mixing machine of claim 14 wherein the mount panel is mounted for pivotal movement between the operating position and the service position.

16. The mixing machine of claim 15 wherein a portion of the mount panel rests on a lower edge of the opening when the mount panel is in the service position.

17. The mixing machine of claim 15, further comprising:

a mount slot located within the column;

the mount panel including an offset bend at an end thereof, the offset portion of the mount panel positioned within the slot to permit both pivotal and upward movement of the mount panel.

18. The mixing machine of claim 17, further comprising:

at least one mount bracket positioned within the column;

the mount panel including a mount flange thereon and positioned for alignment with the mount bracket when the mount panel is placed in the operating position.

19. The mixing machine of claim 18, comprising:

a fastener interconnecting the mount bracket and mount flange to hold the mount panel in the upright position, the fastener releasable to permit the mount panel to pivot to its service position.

20. The mixing machine of claim 19 wherein the slot is formed in a fixed lateral panel positioned within the column, the mount bracket if formed by an upright bent portion of the lateral panel, and the mount flange is formed by a bent portion of the mount panel.

21. The mixing machine of claim 18 wherein first and second vertically spaced mount brackets are provided within the column, and the mount panel includes corresponding first and second spaced mount flanges.

22. The mixing machine of claim 14 wherein a motor drive heat sink is mounted on one side of the mount panel, the heat sink including a plurality of fins associated therewith, the fins arranged substantially vertically at least when the mount panel is in the operating position.

23. The mixing machine of claim 22, further comprising:

a fan located to blow air upward through the fins when the mount panel is in the operating position.

24. The mixing machine of claim 22 wherein the control system includes an electronics board mounted in a spaced relationship to the heat sink, the electronics board arranged substantially vertically at least when the mount panel is in the operating position.

25. The mixing machine of claim 24, further comprising:

a contactor mounted on an opposite side of the mount panel; and a transformer mounted on the opposite side of the mount panel.

26. The mixing machine of claim 13, further comprising:

a removable cover for positioning over the opening when the mount panel is in the operating position.

27. A mixing machine, comprising:

a rotatable output member for receiving a mixer tool;

a column including an opening along a portion thereof;

a drive assembly including a drive motor operatively connected to effect rotation of the rotatable output member;

a control system for controlling operation of the drive motor;

a user interface providing input to the control system; and wherein portions of the control system, including a motor drive heat sink, are formed as a unit that is mounted for movement between an operating position within the column and a service position in which at least part of the unit extends outward from the opening to provide access to the portions of the control system forming the unit;

wherein the unit is pivotally mounted within the column, the operating position is a substantially upright position and the service position is an outwardly pivoted position.

28. The mixing machine of claim 27, further comprising:

a mount bracket within the column;

a mount flange on the unit and aligned with the mount bracket when the unit is in the operating position.

* * * * *